United States Patent

Ellzey, Jr. et al.

[15] 3,655,413

[45] Apr. 11, 1972

[54] COMPOSITION FOR RENDERING CELLULOSIC FABRICS WATER-AND-OIL-REPELLENT

[72] Inventors: Samuel E. Ellzey, Jr.; William J. Connick, Jr., both of New Orleans; Wilson A. Reeves; George L. Drake, Jr., both of Metairie, all of La.

[73] Assignee: The United States of America as represented by the Secretary of Agriculture

[22] Filed: Dec. 9, 1969

[21] Appl. No.: 883,624

[52] U.S. Cl. ............................102/2, 117/135.5, 117/145, 252/8.8
[51] Int. Cl. ..............................................C09k 3/18

[58] Field of Search...............106/2, 13; 252/8.8; 117/135.5, 117/136, 145

[56] References Cited

UNITED STATES PATENTS 3,035,053   5/1962   Coates et al. ...........................106/15

*Primary Examiner*—Lorenzo B. Hayes
*Attorney*—R. Hoffman and W. Bier

[57] ABSTRACT

The reaction product of tetrakis(hydroxymethyl) phosphonium salts and primary 1,1-dihydroperfluoroalkylamines, when applied from aqueous emulsions, renders cellulosic materials repellent to oil and water and increases their resistance to staining by oily materials.

1 Claims, No Drawings

COMPOSITION FOR RENDERING CELLULOSIC FABRICS WATER-AND-OIL-REPELLENT

A non-exclusive, irrevocable, royalty-free license in the invention herein described, throughout the world for all purposes of the United States Government, with the power to grant sublicenses for such purposes, is hereby granted to the Government of the United States of America.

This invention relates to the product formed in the reaction of primary 1,1-dihydroperfluoroalkylamines of the general formula $R_FCH_2NH_2$, wherein $R_F$ is a straight- or branched-chain perfluorinated alkyl group, such as, for example, $C_5F_{11}$, $C_6F_{13}$, $C_7F_{15}$, and the like, and a tetrakis(hydroxymethyl)phosphonium salt of the general formula $[(HOCH_2)_4P^+]_nA^{-n}$, wherein $n$ is the valence of the anion A. A may be any of the common anions such as, for example, Cl, Br, I, $SO_4$, $PO_4$, acetate, and so forth.

More specifically, this invention relates to the product formed by reaction of equimolar amounts of 1,1-dihydroperfluoro-octylamine, $C_7F_{15}CH_2NH_2$, and tetrakis(hydroxymethyl)phosphonium chloride (THPC).

Another object of this invention is to provide a process whereby cellulosic materials are rendered highly oil-repellent and slightly water-repellent. As a consequence of being rendered oil- and water-repellent, the cellulosic materials are rendered more resistant to staining by water-, but more particularly by oil-borne stains.

More specifically, this invention provides a process for rendering cellulosic materials oil- and water-repellent by suitable application thereto of the product from the reaction of equimolar amounts of 1,1-dihydroperfluorooctylamine and THPC.

The 1,1-dihydroperfluoroalkylamines can be readily prepared by the method described in U.S. Pat. No. 3,338,968, issued to S. E. Ellzey, Jr., J. S. Wittman, III, W. J. Connick, Jr., and W. A. Guice.

Reaction of non-fluorinated aliphatic amines with THPC, apparently to give polymers, has been reported in U. S. Pat. No. 2,809,941, issued to W. A. Reeves and J. D. Guthrie. It has now been found that reaction of THPC and 1,1-dihydroperfluorooctylamine in ethanol with various molar ratios of amine to THPC gives solid produces which are rather insoluble in ethanol and many of the common organic solvents. From their elemental analyses the P:N ratios calculated for the products formed with 1:1, 2:1, and 3:1 amine:THPC ratios (after the samples were washed well with ethanol) were 1:1.5, 1:2.0, and 1:2.3. The infrared spectra of the three products were nearly the same and gave few clues as to the structure of the products.

It has been found, however, that the products are capable of rendering cellulosic materials, such as cotton fabric, highly oleophobic and slightly hydrophobic, and the treated fabrics have improved soiling properties compared to fabrics finished with present fluorochemical formulations. In addition to cotton, rayon, wool, leather, paper, and glass may be treated by the process of this invention and are thereby rendered water- and oil-repellent.

These reaction products can be applied to cotton fabric from solution or emulsion by any suitable means such as, for example, dipping and padding between squeeze rolls, or by spraying. Application may be from certain organic solvents, such as ethanol or mixtures of fluorinated alcohols and ethanol, or other inert solvents, but after addition of the fluorinated amine to the THPC solution the separation of the reaction product usually occurs within 2 hours, so that the application of the solution must be done within this time. The isolated solid product may also be dissolved in a suitable solvent and applied as above, but the in situ preparation is preferred. A more advantageous method of applying the fluorinated amine-THPC reaction product is by the use of aqueous emulsions. In this method, a solution of the THPC and a non-ionic surfactant is treated with the fluorinated amine and the mixture is vigorously stirred to provide an emulsion which is stable for at least a month.

When the fluoroamine-THPC reaction product is applied to cotton fabric and the treated fabric is dried and heat cured in the conventional manner, it is found that large strength losses occur in the treated fabric. This situation may be remedied by using a chemical cure rather than a heat cure. It has been found that the treatment of fabrics which have been padded with the fluoroamine-THPC product with either gaseous ammonia or aqueous ammonia, or with both and in any order of treatment, overcomes the high tensile strength losses and makes the resulting finish more durable to laundering. The preferred method for the ammonia cure involves exposing the wet or dry fabric to gaseous ammonia for about 30 seconds, although sufficient ammonia may react in a shorter period of time. After the ammonia cure, a drying step at 80° C., or lower, is sufficient to give good fixation of the finish, although a subsequent high temperature cure may be used when other finishes requiring a high temperature cure are co-applied with the fluoroamine-THPC finish.

The fluoroamine-THPC finish may be mixed with formulations designed to impart permanent press properties to fabrics. For example, dimethylol dihydroxyethylene urea (DMDHEU) is water soluble and may be added to the fluoroamine-THPC emulsion along with and acidic catalyst such as zinc nitrate or magnesium chloride. Fabrics treated with this mixture, after the ammonia cure and a high temperature cure, have slight water repellency, high oil repellency, and have a much higher wrinkle recovery angle than untreated fabric.

The fabrics treated with the fluoroamine-THPC finish have improved repellency to oily soil and are less receptive to oily soil which may be present during laundering. Aqueous soiling properties approximate those of the untreated fabric. For testing purposes the aqueous soil was a mixture of carbon black and a wetting agent in water and the oily soil was a mixture of carbon black and mineral oil in n-dodecane. The degree of soiling of the various fabrics was judged from reflectance measurements on the fabrics. The methods used in the soiling evaluation are fully described in American Dyestuff Reporter, 57, 71 (1968).

Although the preferred amine to THPC ratio is 1:1, improved properties are also obtained when more amine is used; but since adequate repellency is achieved with the 1:1 ratio, is is preferred for economic reasons.

In those cases where the treated materials will not be subjected to laundering or drycleaning, an emulsion containing less than 1.25 percent fluoroamine-THPC will give adequate oil repellency for many purposes.

The following examples are given by way of illustration and are not to be construed as limiting the scope of this invention.

EXAMPLE 1

An emulsion containing THPC and 1,1-dihydroperfluoro-octylamine was prepared in the following manner: to a solution of 4 g. of 80 percent aqueous THPC and 10 g. of Triton X–100 in 379 g. of water was added 6.8 g. of the fluorinated amine in 379 g. of water was added 6.8 g. of the fluorinated amine. Triton X-100 is a surface active agent prepared by the reaction of t-octylphenol with ethylene oxide and is commonly described as an alkyl aryl polyether alcohol having the formula

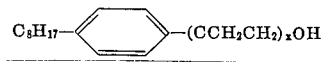

wherein $x=9-10$. The mixture was rapidly stirred for 1 minute on a high speed stirrer, whereupon a faintly turbid emulsion resulted. The concentration of the emulsion (based on the weight of THPC and the amine) was 2.5 percent. Pieces of 68 × 72 desized, scoured, and bleached printcloth (about 3.2 oz./sq. yd.) were padded with the emulsion and the wet samples were exposed to gaseous ammonia in a plexiglas tank or other suitable container into which the gas was continuously fed. After exposure to the ammonia for 3 minutes, the samples were dried at 80° C. for 5 minutes and were washed in running hot water. The cotton fabric was also treated with emulsions having aminerTHPC concentrations of 1.25 percent, 5 percent, and 10 percent. Data on the water and oil repellency of the various samples are shown in Table I Results of soiling experiments on the fluoroamine-THPC treated fabrics are compared with results for some typical commercially used fluorocarbon finishes in Table II.

padded with this emulsion and while still wet was exposed to ammonia gas for 3 minutes. After drying at 80° C. for 5 minutes, the fabric was cured at 155° for 3 minutes and then washed in running hot water. For comparison, a sample of the fabric was finished using a 10 percent solution of DMDHEU and the catalyst. Pertinent data for the samples are shown in Tables III and IV.

TABLE I

[Water and Oil Repellency of Cotton Printcloth Treated with the Fluoroamine-THPC Emulsion]

| Percent Solids | Percent Add-on | Water repellency [1] | Oil Repellency [2] | | |
|---|---|---|---|---|---|
| | | | Initial | After extn.[3] | After 10 launderings[4] |
| 1.25 | 0.3 | 0 | 110 | 0 | 0 |
| 2.5 | 1.9 | 0 | 100 | 80 | 100 |
| 5 | 3.0 | 50 | 110 | 90 | 120 |
| 10 | 6.7 | 50 | 110 | 120 | 120 |

[1] AATCC spray rating.
[2] 3M oil repellency test.
[3] Two-hour Soxhlet extraction with perchloroethylene.
[4] Launderings carried out in an agitator-type home washer.

TABLE III

[Some Properties of Cotton Printcloth Treated With the Fluoroamine-THPC-DMDHEU Formulation]

| Finish | Percent add-on | Oil repellency | | | Wrinkle recovery (W+F), degrees | |
|---|---|---|---|---|---|---|
| | | Initial | After extn. | After 15 laund. | Cond. | Wet |
| Untreated | 0 | | | | 202 | 190 |
| 10% DMDHEU | 8.1 | | | | 292 | 273 |
| 2.5% fluoroamine-THPC-10% DMDHEU | 7.3 | 100 | 0 | 70 | 285 | 273 |

TABLE II

[Soiling Characteristics of Various Fluorochemical Treatments on Cotton Printcloth]

| Finish | Percent solids in bath | Percent Reflectance | | | | | | |
|---|---|---|---|---|---|---|---|---|
| | | Initial | Aqueous soil | | | Oily soil | | |
| | | | Soiled | Laundered [1] | Laundered with soil [2] | Soiled | Laundered | Laundered with soil |
| Untreated | 0 | 87 | 25 | 35 | 80 | 34 | 44 | 46 |
| Fluoroamine THPC | 2.5 | 86 | 36 | 44 | 76 | 40 | 46 | 46 |
| Fluoroamine-THPC | 5 | 86 | 39 | 49 | 74 | 40 | 48 | 34 |
| A[3] | 2.5 | 84 | 60 | 75 | 82 | 22 | 23 | 2 |
| B[3] | 0.7 | 84 | 58 | 66 | 76 | 30 | 28 | 2 |
| C[3] | 0.7 | 86 | 40 | 46 | 74 | 20 | 24 | 10 |

[1] Soiled sample given 1 home laundering.
[2] Clean sample given 1 home laundering in the presence of soil.
[3] Typical commercially used fluorocarbon formulations.

TABLE IV

Soiling Characteristics of Cotton Printcloth Treated with the Fluoroamine-THPC-DMDHEU Formulation

| Finish | Percent reflectance | | | | | | |
|---|---|---|---|---|---|---|---|
| | Initial | Aqueous soil | | | Oily soil | | |
| | | Soiled | Laundered | Laundered with soil | Soiled | Laundered | Laundered with soil |
| Untreated | 84 | 25 | 37 | 81 | 56 | 69 | 65 |
| DMDHEU | 83 | 23 | 35 | 79 | 59 | 73 | 61 |
| Fluoroamine THPC-DMDHEU | 82 | 32 | 49 | 72 | 57 | 66 | 42 |

EXAMPLE 2

To a mixture of 6.8 g. of 1,1-dihydroperfluorooctylamine and 10 g. of Triton X-100 was added 4 g. of 80% THPC and 266 g. of water before stirring at high speed for 1 minute. To this emulsion was added with stirring 88.9 g. of a 45 percent aqueous solution of dimethylol dihydroxyethylene urea (DMDHEU) and 24 g. of a 50 percent aqueous solution of magnesium chloride hexahydrate. Cotton printcloth was

We claim:

1. A treating composition for imparting soil resistance to a textile fabric comprising an aqueous emulsion of about from 2.5 percent to 5.0 percent by weight based on the total weight of a product prepared by mixing at room temperature equimolar ratios of 1,1-dihydroperfluorooctylamine and tetrakis(hydroxymethyl)phosphonium chloride in water.

* * * * *